United States Patent [19]

Dorner

[11] Patent Number: 4,684,308

[45] Date of Patent: Aug. 4, 1987

[54] STACKER ASSEMBLY FOR A CONVEYOR SYSTEM

[75] Inventor: Wolfgang C. Dorner, Oconomwooc, Wis.

[73] Assignee: Dorner Mfg. Corp., Hartland, Wis.

[21] Appl. No.: 770,397

[22] Filed: Aug. 28, 1985

[51] Int. Cl.$^4$ ............................................. B65G 57/30
[52] U.S. Cl. ........................................ 414/96; 53/541
[58] Field of Search ...................... 414/37, 92, 95, 96; 198/347, 468.8; 271/212; 53/541

[56] References Cited

U.S. PATENT DOCUMENTS

| | | | |
|---|---|---|---|
| 2,978,125 | 4/1961 | Freeman | 414/96 X |
| 3,053,402 | 9/1962 | Russell et al. | 414/37 |
| 3,126,104 | 3/1964 | Haselton et al. | 414/96 X |
| 3,235,100 | 2/1966 | Raynor | 414/96 X |
| 3,342,350 | 9/1967 | Seragnoli | 414/96 X |
| 3,403,792 | 10/1968 | Lape | 414/96 |
| 3,470,996 | 10/1969 | Lee et al. | |
| 3,506,109 | 4/1970 | Braas | 414/95 X |
| 3,876,057 | 4/1975 | Jones | |
| 4,141,458 | 2/1979 | Brooks et al. | |
| 4,273,234 | 6/1981 | Bourgeois | 198/347 |
| 4,290,517 | 9/1981 | Hafferkamp | 198/427 |
| 4,352,617 | 10/1982 | Sakai et al. | 414/95 |

FOREIGN PATENT DOCUMENTS

| | | | |
|---|---|---|---|
| 1133308 | 7/1962 | Fed. Rep. of Germany | 414/96 |
| 2413536 | 10/1975 | Fed. Rep. of Germany | 271/212 |
| 3320292 | 12/1984 | Fed. Rep. of Germany | 53/541 |

Primary Examiner—Leslie J. Paperner
Attorney, Agent, or Firm—Andrus, Sceales, Starke & Sawall

[57] ABSTRACT

A stacker assembly for a conveyor system. The conveyor system includes a belt conveyor to convey a plurality of articles having a size such that the sides of the articles overhang the side edges of the conveyor. A pair of lift blocks are disposed beneath and on opposite sides of the conveyor and can be moved from an outer retracted position to an inner lifting position. In the lifting position the inner edges of the lift blocks are located beneath the overhanging sides of an article stopped on the conveyor. The lift blocks are elevated by means of a fluid cylinder to raise the article above the conveyor and into a storage rack. As the article is elevated, cams on the lift blocks engage cam surfaces on spaced support members to wedge the support members apart and enable the articles to be elevated above the support members. The support members automatically return to the supporting position to hold the article in the storage rack. The lift blocks are then moved laterally outwardly and then downwardly to their original position beneath the level of the conveyor.

6 Claims, 7 Drawing Figures

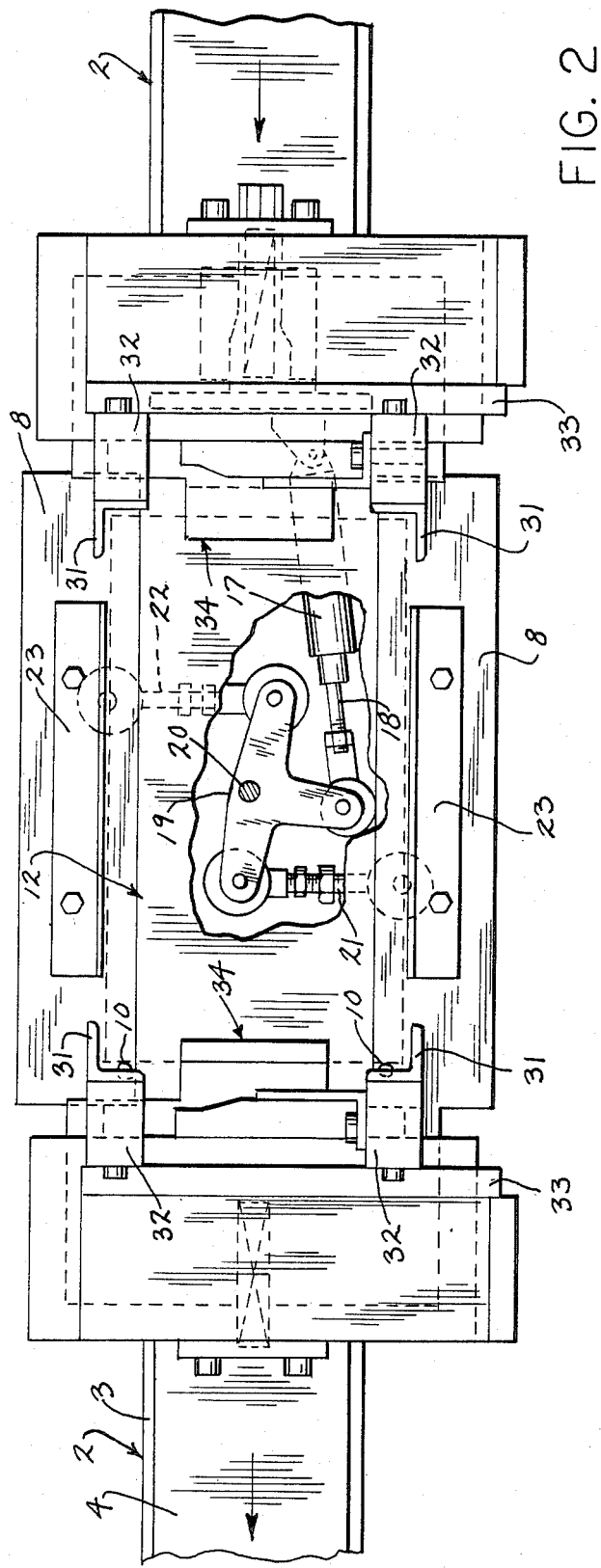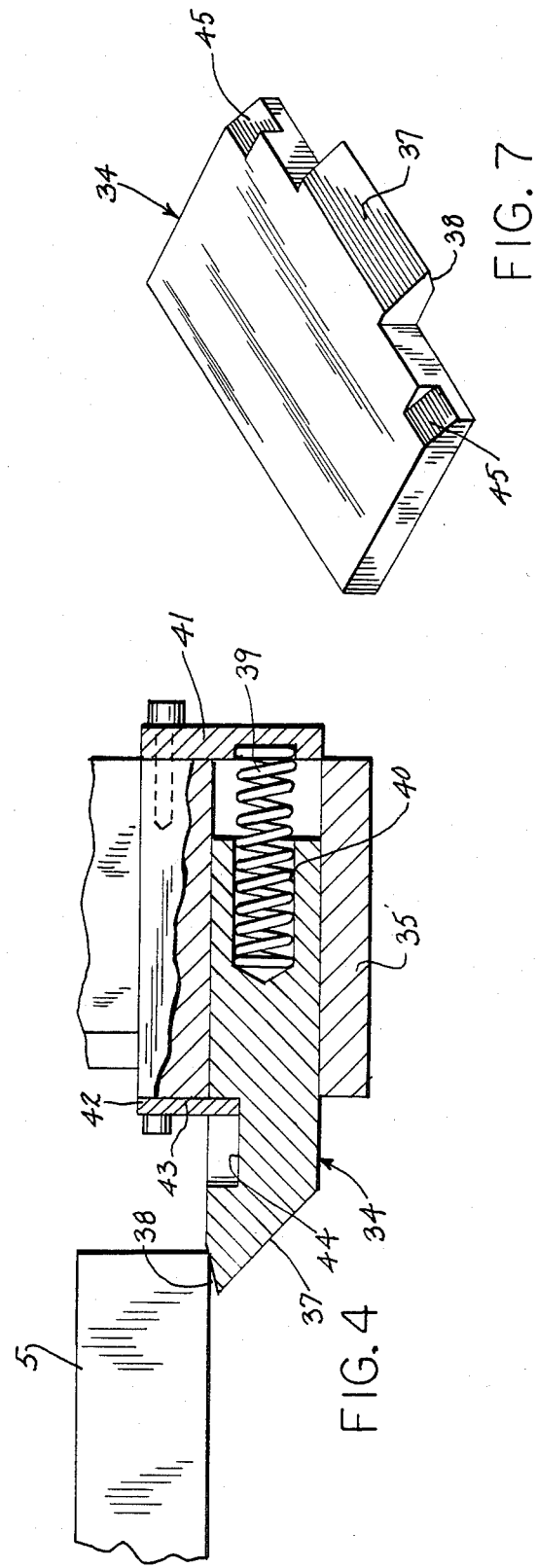

STACKER ASSEMBLY FOR A CONVEYOR SYSTEM

BACKGROUND OF THE INVENTION

In a conveying system for conveying small articles such as cassettes or pallets, it is frequently necessary to remove the articles from the conveyor for processing. Traditionally, an operator has manually gathered the articles as they pass along the conveyor, and manually stacked the articles in preparation for transporting to the processing equipment. The manual gathering and stacking of the articles requires considerable labor and is a substantial cost factor.

Automatic stacking mechanisms have been proposed in the past, such as shown in U.S. Pat. No. 3,470,996. In the stacking mechanism, as shown in the aforementioned patent, articles on a conveyor are pushed laterally by a pusher unit from a conveyor to a position beneath a stacking chute. A lift cylinder then operates to elevate the article upwardly into the chute and the elevated article is then held in the chute by a second plunger which is located opposite the pusher assembly. While devices of the type shown in the aforementioned patent can serve to stack articles one on top of each other, the mechanism requires that the articles slide against each other during movement from the conveyor to the stacking chute and this can cause substantial damage and scratching to the articles, if they are of a delicate nature.

SUMMARY OF THE INVENTION

The invention is directed to an improved apparatus for automatically removing articles from a conveyor and stacking the articles so they can be subsequently moved to processing equipment. In accordance with the invention, a plurality of small articles, such as cassettes or pallets, are transported on a belt conveyor and the articles have a size, such that the side edges of the articles will overhang the sides of the conveyor.

A pair of lift blocks are disposed at a level beneath the conveyor and are movable laterally from an outer retracted position to an inner lifting position. In the inner lifting position, the inner edges of the lift blocks are located beneath the overhanging edges of the articles moving on the conveyor.

A movable stop mechanism is employed to selectively stop the articles moving along the conveyor at a location above the lift blocks. If an article is to be stacked, the lift block are moved inwardly, thereby stopping the article and bringing the inner edges of the lift blocks into a position under the overhanging edges of the article. The lift blocks are then elevated to move the article upwardly from the conveyor into a storage rack which is located directly above the conveyor. The stacked articles are held in the rack by a pair of movable support members which are biased to an inner supporting position where they support the opposite edges of the stacked article.

A cam is associated with each lift block and as the lift blocks move upwardly, elevating the article, the cams engage cam surfaces on the respective support members to move the support members outwardly against the biasing force to permit the article to move upwardly between the support members. With the article elevated above the level of the support members, the cams are disengaged from the cam surfaces, thereby enabling the support members to be moved inwardly to the inner supporting position by the biasing force, where the support members support the elevated article. The lift blocks are then moved outwardly and downwardly to their original position beneath the level of the conveyor in preparation for stacking a succeeding article.

The stacking assembly of the invention can serve to automatically stack articles one beneath the other in a storage rack, where the articles can be readily removed for subsequent processing. The stacking mechanism can be selectively operated to permit the articles to pass freely along the conveyor, or alternately, to stop the articles and stack the same.

As the stacking mechanism is not actuated by the articles themselves, there is no problem of damage or scratching by virtue of the stacked articles sliding on each other.

Other objects and advantages will appear in the course of the following description.

DESCRIPTION OF THE DRAWINGS

The drawings illustrate the best mode presently contemplated of carrying out the invention.

In the drawings:

FIG. 2 is a top plan view of the assembly with parts broken away;

FIG. 4 is an enlarged fragmentary side elevation of a support member with parts broken away;

FIG. 7 is a perspective view of one of the support members, with the bottom surface being shown.

DESCRIPTION OF THE ILLUSTRATED EMBODIMENT

Figures 3, 5, 6:
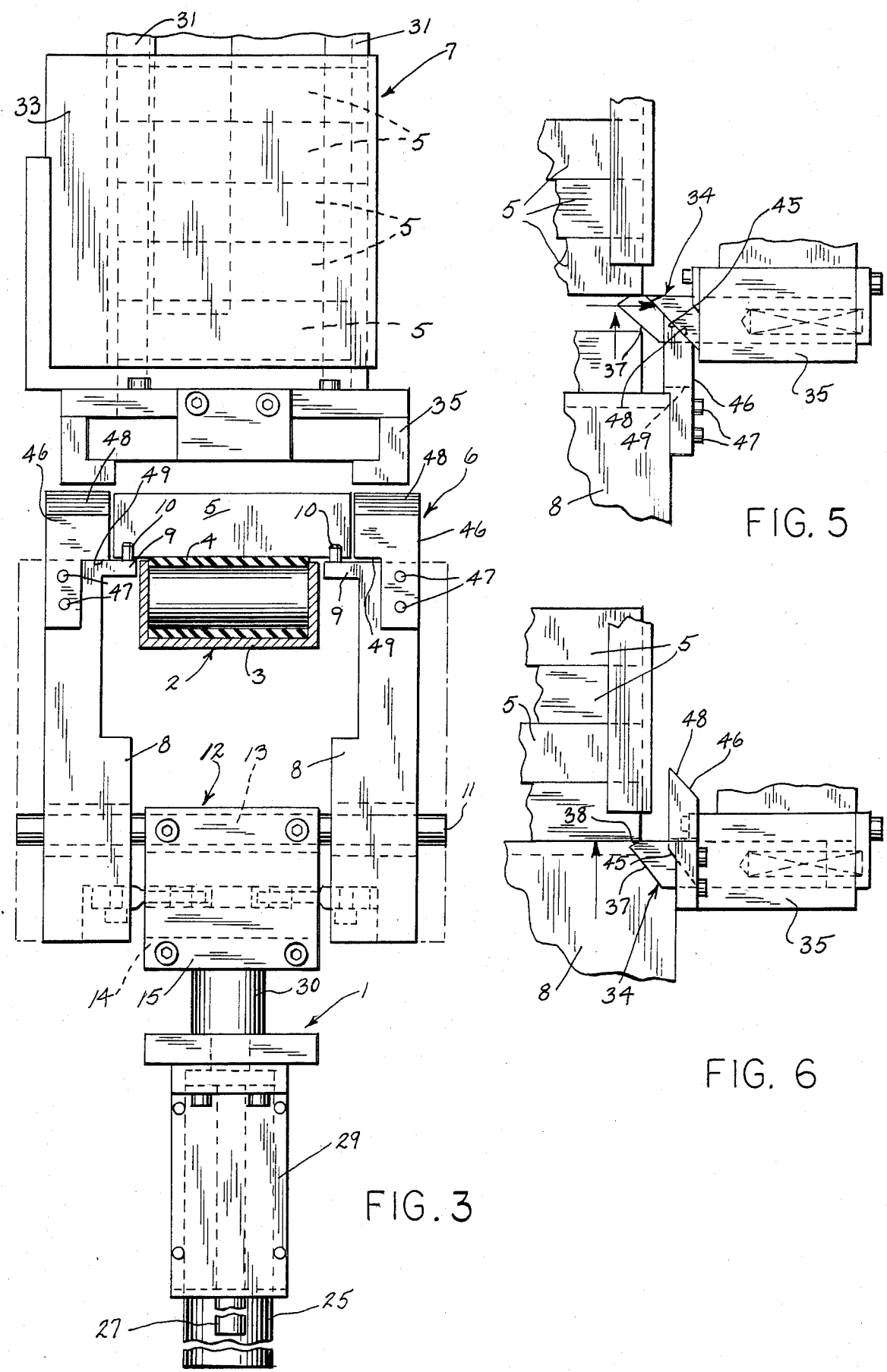
FIG. 3 is an end view of the stacker assembly.
FIG. 5 is a fragmentary side elevation showing an article being elevated to the storage rack.
FIG. 6 is a view similar to FIG. 5 and showing the article supported in the storage rack.

The drawings illustrate a conveyor system including a supporting structure or frame 1 on which is mounted a belt conveyor 2. As best shown in FIG. 3, the belt conveyor includes a generally U-shaped frame 3 which supports an endless belt 4. A plurality of articles 5, such as cassettes, pallets, or the like, travel on the conveyor 2 and, as shown in FIG. 3, the articles 5 have a size such that the side edges of the articles overhang the corresponding side edges of the conveyor 2.

In accordance with the invention, a stacker assembly 6 serves to selectively remove articles 5 from the conveyor 2 and stack the articles one on another in a storage rack 7 which is located directly above conveyor 2.

The stacking assembly includes a pair of lift blocks 8 which are located in spaced relation beneath the top level of the conveyor 2. Lift blocks 8 are mounted to move laterally of the conveyor from an outer retracted position to an inner operative or lifting position. Flanges or support edges 9 extend inwardly from the upper edge of each lift block 8, and when the lift blocks are in the inner lifting position, edges 9 will be located beneath the overhanging edges of articles 5, as shown in FIG. 3.

Mounted on the downstream end of each support edge 9 is stop pin 10, and when the lift blocks 8 are moved to the inner or lifting position, the stop pins will be positioned in the path of travel of articles 5 to thereby stop movement of an article on the moving conveyor. Pins 10 are located so that the stopped article will be positioned directly beneath the storage rack 7.

When the lift blocks 8 are in the inner lifting position, the blocks are spaced apart a sufficient distance so that as the lift blocks elevate an article to the storage rack 7, a second article can pass between the lift blocks on conveyor 2.

Lift blocks 8 are guided in lateral movement between the retracted and lifting positions, on a pair of spaced horizontal guide rods 11 which are carried by a lifting frame 12. Lifting frame 12 includes an upper horizontal plate 13, a lower horizontal plate 14 and a pair of end plates 15 and 16 which connect the corresponding ends of plates 13 and 14.

To move the lift blocks 8 laterally, a fluid cylinder 17 is pivotally connected to end plate 15, and a piston rod 18, slidable in cylinder 17, is pivotally connected to the stem portion of a T-shaped link 19 which is mounted for pivoting movement on pin 20 carried by upper plate 13, as shown in FIG. 2. A link 21 connects one arm of the T-shaped link 19 to one of the lift blocks 8, while a second link 22 connects the opposite arm of T-shaped link 19 to the opposite lift block 8. With this construction, extension of the piston rod 18 will pivot the T-shaped link 19 in a manner to move the lift blocks 8 inwardly to the lifting position, while retraction of the piston rod 18 will move the lift blocks 8 outwardly to the retracted or storage position.

Mounted on the upper surface of each lift block is a guide bar 23, which act to restrain lateral movement of the article 5 as it is elevated by lift blocks 8.

To raise and lower the lift blocks 8, a fluid cylinder mechanism is utilized including a cylinder 25 mounted on frame 1. A piston rod 26 slidable within cylinder 25 is connected to the lower surface of plate 14 of lifting frame 12. By extending piston rod 26 the lifting frame 12 and lift blocks 8 will be elevated.

To guide the lift blocks 8 in vertical movement, a pair of guide rods 27 extend downwardly from plate 14 and are slidable within cylindrical bushings 28 mounted on frame 1 through angles 29. To limit the downward movement of the lift frame 12 and lift blocks 8, cylindrical sleeves or bumpers 30 are positioned around the guide rods and are located above frame 1.

Storage rack 7 is composed of vertical four corner angles 31 and each pair of corner angles is connected through spacers 32 to an end plate 33. In the stacked position, the articles 5 are supported in the storage rack 7 by a pair of spaced support members or slides 34.

Figure 1:
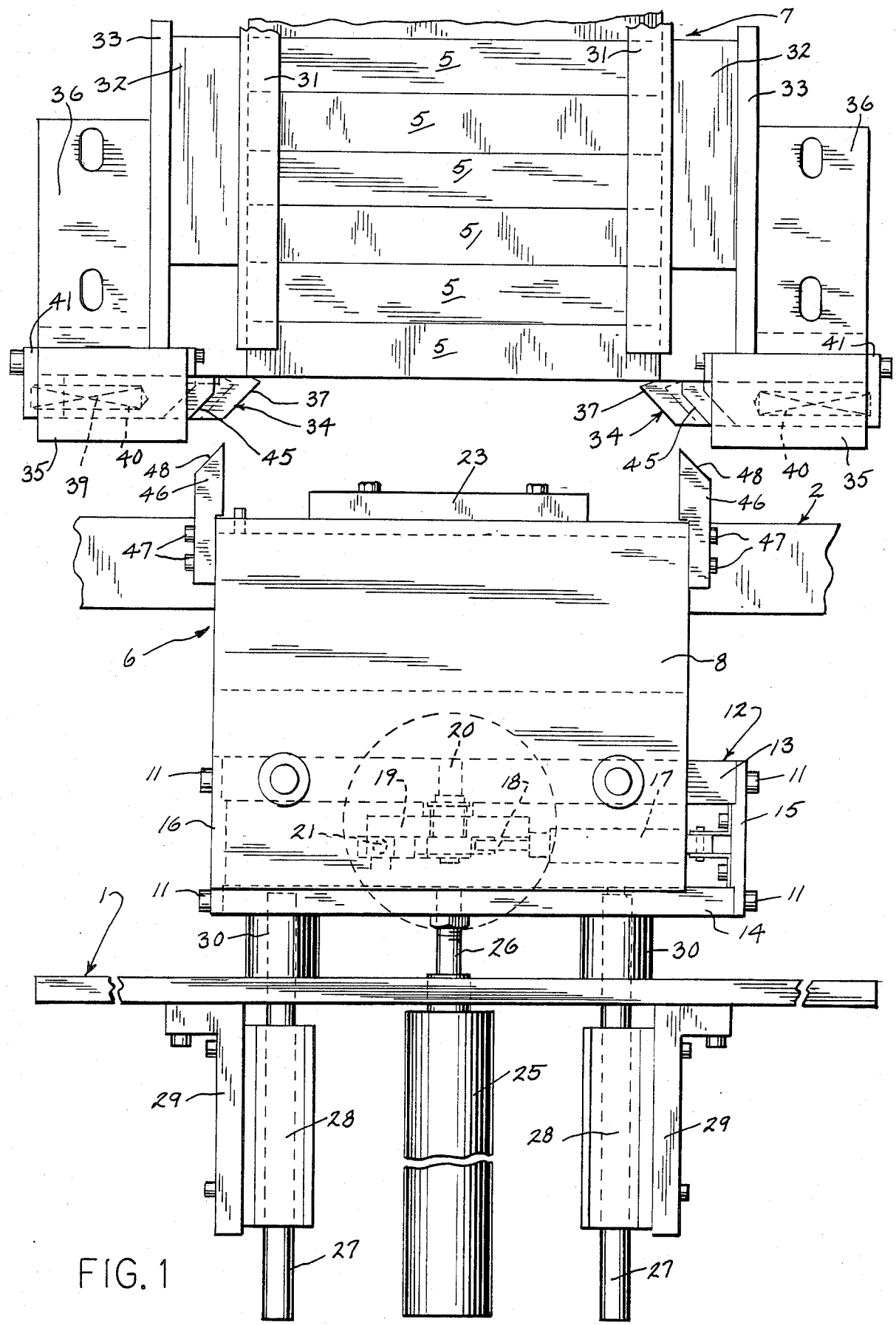
FIG. 1 is a side elevation of the stacker assembly of the invention.

Each support member is mounted for sliding movement in a block 35 carried from the respective plates 33 by a bracket 36. Support members 34 are movable between an inner supporting position where they support a stack of articles 5, as shown in FIG. 1, and an outer retracted position where the support members are spaced apart sufficiently to permit an article to be elevated between the retracted support members.

As best illustrated in FIGS. 4 and 7 each support member is provided with a beveled surface 37 which is located at an angle of about 45° to the horizontal and the upper end of each beveled surface 37 terminates in a chamfered surface 38 that is located at an angle of about 12° to the horizontal.

Each support member is biased inwardly to the supporting position by a compression spring 39 which is mounted within a hole 40 in the outer end of the support member. The inner end of the spring bears against the bottom of hole 40, while the outer end bears against plate 41 connected to block 35. Thus, the force of spring 39 will urge the support member inwardly to the supporting position.

To limit the inward movement of the support member 34 under the influence of spring 39, a stop plate 42 is mounted on the upper surface of the support member and has a downwardly extending flange 43 which is received within a pocket or recess 44 formed in the upper surface of the support member 34, as best shown in FIG. 4. Engagement of the flange 43 of stop plate 42 with the end of recess 44 will limit the inward movement of the support member.

Each support member 34 is also provided with a pair of inclined cam surfaces 45 which are located on either side of the beveled surface 37.

Support members 34 are adapted to be moved outwardly to the retracted position as the article is elevated by a cam mechanism attached to the respective lift blocks 8. In this regard, a pair of cams 46 are connected to the upper edge of each lift block through bolts 47, and each cam has an inclined cam surface 48 which is adapted to engage the corresponding cam surface 45 on the corresponding support member 34 as the lift blocks are elevated. Engagement of cam surfaces 48 with surfaces 45 will cause the support members 34 to be wedged outwardly against the force of springs 39 until the cam surfaces 48 clear the upper ends of surfaces 45, and the surfaces 45 will then drop into notches 49 in cams 46, thereby permitting the support members 34 to move inwardly to the supporting position under the influence of springs 39. Notches 49 are best shown in FIG. 3. The cam surfaces 45 and 48 are notches 49 are arranged so that the lower surface of the article 5 being elevated will be located slightly below the upper surface of the support members 34 when the cam surfaces 45 move into notches 49, with the result that the support members 34 will move inwardly beneath the elevated article. The chamfered edges 38 on the support members 34 serve to wedge the article 5 up a slight distance, in the neighborhood of 1/16th inch and above the level of the supporting edges 9, as the support members 34 move inwardly their supporting position. Therefore, when the supporting edges 9 of the lift blocks 8 are moved laterally outward they will not drag on the bottom of the stacked articles 5.

When an article is supported on support members 34, the opposite corners of the article will rest on the inclined chamfered surfaces 38 in essentially a line contact. As the support members are moved outwardly, the corners drag on the surfaces 38 to prevent scratching or marring of the bottom surface of the article.

In operation of the stacker assembly, a series of articles 5 are moved along the conveyor 2 and under normal conditions the articles pass directly through the stacker assembly. When it is desired to stack a series of articles, the lift blocks 8 are moved inwardly to the lifting position by operation of cylinder 17 to thereby position the stop pins 10 in the path of travel of articles 5 on moving conveyor 2. The next succeeding article will then be stopped by pins 10 at a location directly beneath the storage rack 7.

Lift blocks 8 are then elevated through operation of cylinder 25 causing the stopped article to be lifted upwardly from the conveyor on edges 9 of the lift blocks.

As the lift blocks 8 are elevated, the cam surfaces 48 on the lift blocks will engage the cam surfaces 45, thereby wedging the support members 34 outwardly against the force of springs 39 and permitting the article to pass between the retracted support members. With the lower surface of the article above the upper surface of support members 34, the notches 49 in cams 46 will register with the cam surfaces 45, releasing the support members 34 and enabling the support members to move inwardly to a supporting position beneath the elevated article.

The lift blocks 8 are then moved laterally outward through operation of cylinder 17 to separate the cams 46 from the support members 34 and as the lower surface of the article is not at this time resting on the support edges 9 of lift blocks 8, there will be no frictional drag as the lift blocks are moved laterally outwardly. The lift blocks are then lowered through operation of cylinder 25 to a location beneath the conveyor 2 in position to elevate a succeeding article that has been stopped by pins 10 into the storage rack 7. The succeeding article will be moved into the storage rack in the manner previously described and elevation of the succeeding article will move the stacked articles in rack 7 upwardly.

Various modes of carrying out the invention are contemplated as being within the scope of the following claims particularly pointing out and distinctly claiming the subject matter which is regarded as the invention.

I claim:

1. A stacker assembly for a conveyor system, comprising a conveyor to convey a plurality of articles, said articles having a size such that the side edges of the articles overhang the corresponding sides of the conveyor, a pair of lift members disposed on opposite sides of the conveyor and being movable laterally of the conveyor between an outer retracting position and an inner lifting position, each lift member having an inner edge arranged to be disposed laterally outward of the corresponding side of the conveyor beneath the corresponding overhanging edge of the article when the lift member is in the lifting position, a storage rack disposed above the conveyor, lifting means for lifting said lift members to lift the articles from the conveyor into the storage rack, said storage rack including a pair of spaced support members disposed to support an article in said storage rack, said support members being movable between an outer retracted position in which said support members are spaced apart a sufficient distance to permit an article to pass therebetween, and an inner supporting position where said support members will support opposed side edges of said article, biasing means for biasing said support members to the supporting position, a first cam surface on each of said lift members, a second cam surface on each support member and disposed to be engaged by the respective first cam surfaces as the lift members are elevated to move the support members to the retracted position, each support member having an upper article supporting surface and a downwardly and outwardly extending lower surface constructed and arranged to prevent contact between the support member and the article as the article is lifted by the lift members, means responsive to the article being elevated to the approximate level of the upper surface of said supporting members for disengaging said first cam surfaces and said second cam surfaces to permit said support members to move to the inner supporting position under the force of said biasing means, and means for moving the lift members laterally outward to said retracted position to permit said lift members to be lowered without interference with said support members.

2. The assembly of claim 1, and including stop means associated with at least one of said lift members and disposed in the path of travel of said articles on said conveyor when said lift members are in the lifting position to thereby stop an article moving on said conveyor.

3. The assembly of claim 1, wherein the upper surface of each support member is inclined upwardly and outwardly, and disposed to engage said article and cam said article upwardly as the support members are moved to the supporting position.

4. The assembly of claim 3, wherein the upper surface of each support member is inclined at an angle of about 12° with respect to the horizontal.

5. The assembly of claim 1, wherein each first cam surface comprises an inclined surface disposed at an angle to the vertical and each second cam surface comprises an inclined surface disposed at an angle to the vertical.

6. The assembly of claim 1, and including cam means connected to each support member and disposed to engage the article as the support members move to the supporting position for elevating said article above the lift members to enable said lift members to be moved laterally outward without riding against said article.

* * * * *